United States Patent
Devaraj et al.

(10) Patent No.: US 11,865,938 B2
(45) Date of Patent: Jan. 9, 2024

(54) CHARGING SYSTEM FOR ELECTRONIC VEHICLES

(71) Applicant: Ford Global Technologies, LLC, Dearborn, MI (US)

(72) Inventors: Sujitha Krishna Devaraj, Troy, MI (US); Josh Fodale, Ypsilanti, MI (US); Robert Hinh, Cincinnati, OH (US); Adrian Kalinowski, Sterling Heights, MI (US); Rafi Odisho, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1117 days.

(21) Appl. No.: 16/539,316

(22) Filed: Aug. 13, 2019

(65) Prior Publication Data

US 2021/0049712 A1    Feb. 18, 2021

(51) Int. Cl.
| | |
|---|---|
| *B60L 53/60* | (2019.01) |
| *G06Q 50/06* | (2012.01) |
| *G06Q 20/18* | (2012.01) |
| *B60L 53/66* | (2019.01) |
| *G06Q 20/08* | (2012.01) |

(Continued)

(52) U.S. Cl.
CPC ............. *B60L 53/60* (2019.02); *B60L 53/665* (2019.02); *B60L 53/67* (2019.02); *G06Q 20/0855* (2013.01); *G06Q 20/18* (2013.01); *G06Q 50/06* (2013.01); *B60L 50/60* (2019.02); *G06Q 20/06* (2013.01); *Y02T 90/12* (2013.01)

(58) Field of Classification Search
CPC .... G06Q 50/06; G06Q 20/0855; G06Q 20/18; G06Q 20/06; B60L 53/60; B60L 53/665; B60L 53/67; B60L 50/60; Y02T 90/12

USPC ......................................................... 320/104
See application file for complete search history.

(56) References Cited

U.S. PATENT DOCUMENTS

| | | | | |
|---|---|---|---|---|
| 2010/0274570 A1* | 10/2010 | Proefke | ................... | B60L 53/67 |
| | | | | 701/22 |
| 2011/0302078 A1* | 12/2011 | Failing | ................... | B60L 53/126 |
| | | | | 700/297 |

(Continued)

FOREIGN PATENT DOCUMENTS

| | | | | |
|---|---|---|---|---|
| CN | 113400962 A | * | 9/2021 | ............. B60L 53/12 |
| DE | 102018203387 A1 | * | 9/2019 | |
| KR | 20190005011 A | | 1/2019 | |

OTHER PUBLICATIONS

Ahmed, MA, Kim Y-C, "Energy Trading with Electric Vehicles in Smart Campus Parking Lots," Applied Sciences 2018; 8(10): 1749.

*Primary Examiner* — Richard Isla
*Assistant Examiner* — Manuel Hernandez
(74) *Attorney, Agent, or Firm* — David B. Kelley; Brooks Kushman, P.C.

(57) ABSTRACT

A charging system for a battery powered vehicle may include a memory configured to maintain customer accounts, and a processor configured to receive requests from a first customer at a charging station for an increased rate of charge, transmit the request to at least one other customer at the charging station in response to verification of the customer account associated with the first customer; and instruct the charging station to increase the rate of charge for the first customer and decrease the rate of charge for the at least one other customer in response to the at least one other customer accepting the request.

13 Claims, 5 Drawing Sheets

(51) Int. Cl.
  *B60L 53/67* (2019.01)
  *B60L 50/60* (2019.01)
  *G06Q 20/06* (2012.01)

(56) References Cited

U.S. PATENT DOCUMENTS

| | | | |
|---|---|---|---|
| 2013/0307475 A1* | 11/2013 | Kishiyama | H02J 7/04 |
| | | | 320/109 |
| 2019/0039467 A1* | 2/2019 | Hortop | H02J 7/0071 |
| 2019/0066068 A1 | 2/2019 | Mitchell et al. | |
| 2021/0284039 A1* | 9/2021 | Ando | B60L 53/63 |
| 2021/0296939 A1* | 9/2021 | Lu | B60L 53/68 |
| 2021/0300198 A1* | 9/2021 | Choi | G06N 3/0454 |
| 2022/0063433 A1* | 3/2022 | Lu | G06Q 10/06 |

* cited by examiner

CHARGING SYSTEM FOR ELECTRONIC VEHICLES

TECHNICAL FIELD

Aspects of the disclosure generally relate to a charging system for electric vehicles.

BACKGROUND

Electric vehicles are becoming more and more popular. With an increase in electric vehicles on the streets, charging stations have become increasingly crowded. Drivers may become frustrated with the availability, as well as the charging speeds, at the various charging stations. This may especially be the case for long distance travel when electric vehicles may require longer charging periods.

SUMMARY

A charging system for a battery powered vehicle may include a memory configured to maintain customer accounts; and a processor configured to receive a request from a first customer at a charging station for an increased rate of charge, transmit the request to at least one other customer at the charging station in response to verification of the customer account associated with the first customer, and instruct the charging station to increase the rate of charge for the first customer and decrease the rate of charge for the at least one other customer in response to the at least one other customer accepting the request.

A vehicle may include a battery configured to charge at a first rate at a charging station, a user interface configured to receive user input, and a processor configured to transmit requests from a first customer to a charging station for an increased rate of charge and first fee, and receive an acceptance from at least one other customer indicating that the at least one other customer will realize a decreased rate of charge and the first customer will realize the increased rate of charge.

A charging system for a battery powered vehicle may include a memory configured to maintain customer accounts, and a processor configured to receive a request from a first customer at a charging station for an increased rate of charge, compare the first fee with an amount of funds in the customer account associated with the first customer, transmit, in response to the amount of funds in the customer account associated with the first customer exceeding the first week, the request to at least one other customer at the charging station in response to verification of the customer account associated with the first customer, and instruct the charging station to increase the rate of charge for the first customer and instruct the memory to transfer funds from the customer account associated with the first customer to at least one other customer account associated with the at least one other customer in response to the at least one other customer accepting the request.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
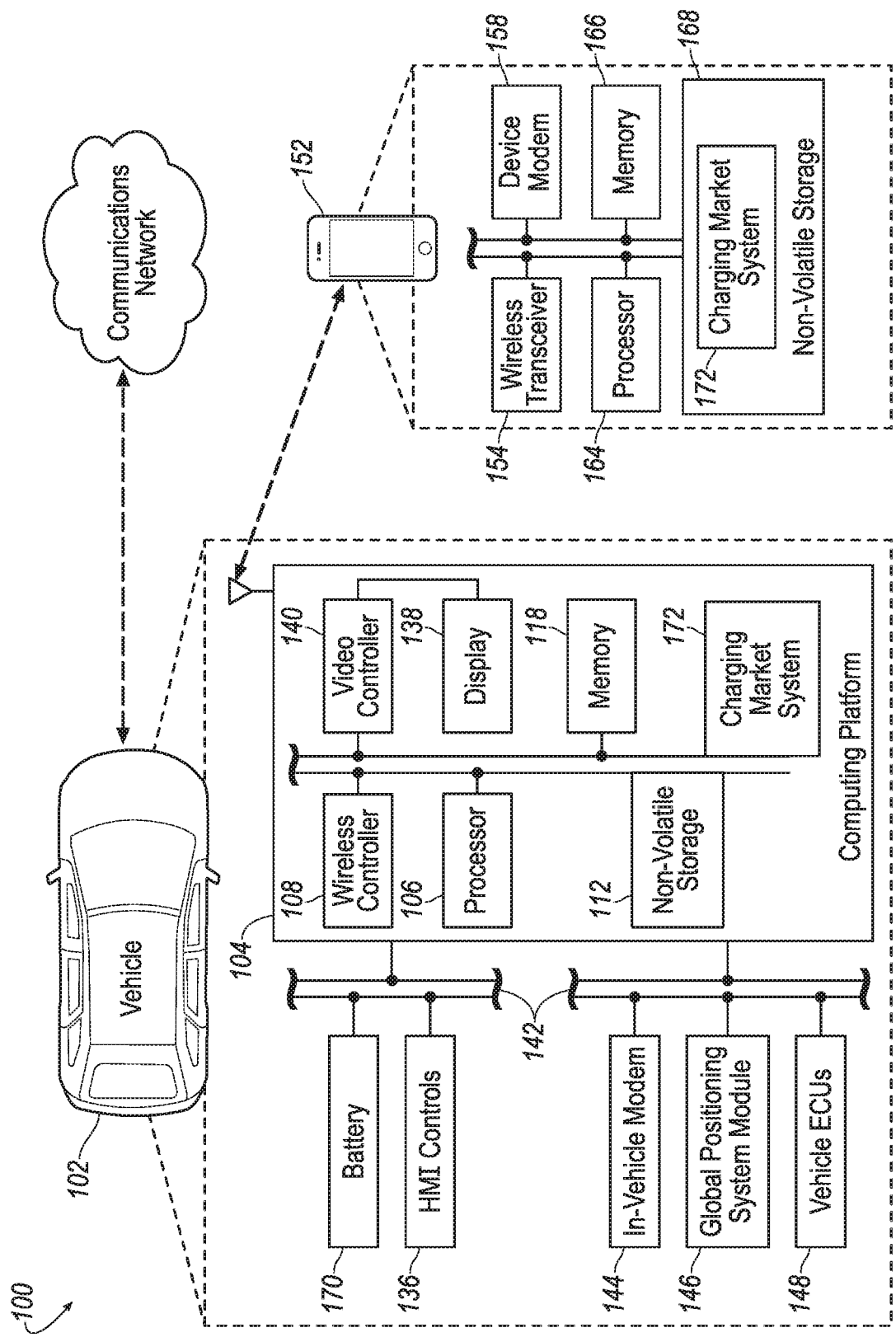
FIG. 1 illustrates an example diagram of a charging system showing a vehicle and mobile device.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a charging system for an electric vehicle. Vehicles having batteries may stop at various charge stations to attempt to charge the vehicle. Public charge stations may have multiple bays allowing more than one vehicle to charge at a time. However, the charge station may draw from a single electrical line, and the rate of charge for a vehicle may depend on the quantity of other vehicles concurrently charging. For example, if two vehicles are charging at a station that provides 120 kWh, then each vehicle may charge at a 60 kWh.

For customers traveling long distances, charge times may be relatively high, especially if the charging station is hosting multiple vehicles. This may be inconvenient and cause delays in the customer's trip. In order to allow customers to charge at a faster rate, the customer may participate in surge pricing. However, such surge pricing may be extremely expensive, and also lower the charging rate of the other vehicles.

In a charging marketplace system described herein, the customer may offer to incentivize the other vehicles using the charge station to decrease their rate of charge. This may be done by the customer offering to pay the other vehicles to lower their charging rate in order to allow the customer to increase his or her charging rate. That is, the customer may consume a higher charge rate without paying a surge charge but instead, paying the other customers. Crypto currency in the form of tokens may allow for peer-to-peer micro transactions to occur without the high fees of credit cards.

Thus, customers that desire a higher rate of charge may achieve one if they are willing to pay more for their charge. These customers may be ones traveling or passing through with no intent to park and leave their vehicle at the charge station. Conversely, users that may intend to leave their vehicle at the charge station for a longer period of time may not have a preference as to their charge rate and may receive compensation to reduce their rate of charge.

The charging marketplace system may facilitate transactions between customers or clients using a centralized node to facilitate the exchange of tokens for rate of charge. Customers may receive a high degree of satisfaction by receiving tokens when they do not require a high rate of charge and conversely, customers who do desire a high rate of charge, may appreciate being able to achieve such rates.

FIG. 1 illustrates an example diagram including a vehicle 102 and a mobile device 152, each shown as having a charging marketplace system 172 (and further shown in FIG. 2) for vehicles. The vehicle 102 may be configured to access telematics servers and mobile devices. The vehicle 102 may include various types of passenger vehicles, such as crossover a utility vehicle (CUV), a sport utility vehicle (SUV), a truck, a recreational vehicle (RV), a boat, a plane or other mobile machine for transporting people or goods. The vehicle 102 may be a battery powered vehicle such as an electric or electrified vehicle (EV), which includes battery electric vehicles (BEV). The vehicle 102 may also include PHEVs (plug-in hybrid electric vehicles) and hybrid electric vehicles (HEV). The vehicle 102 may be an autonomous vehicle. Telematics services may include, as some non-limiting possibilities, navigation, turn-by-turn directions, vehicle health reports, local business search, accident reporting, and hands-free calling. In an example, the vehicle 102 may include the SYNC system manufactured by The Ford Motor Company of Dearborn, MI It should be noted that the illustrated system is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications to provide features such as navigation, accident reporting, satellite radio decoding, and hands-free calling. Such instructions and other data may be maintained in a non-volatile manner using a variety of types of computer-readable storage medium. The computer-readable medium (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may also receive input from human-machine interface (HMI) controls 136 configured to provide for occupant interaction with the vehicle 102. The computing platform 104 may also drive or otherwise communicate with one or more displays 138 or interfaces configured to provide visual output to vehicle occupants by way of a video controller 140. In some cases, the display 138 may be configured to display state-of-charge (SOC) of the vehicle, including other information related to the stored energy of the vehicle such as trip range, battery range, etc. The display 138 may also be configured to display screens and options related to a charging market system 172, allowing customers to make requests to other customers for an increase in rate of charge when charging the vehicle battery 170. The computing platform 104 may include a memory 118.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs (electronic control units) 148 configured to incorporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

The vehicle 102 includes a battery 170. The battery 170 may include at least one high voltage (HV) battery such as a traction battery. The battery 170 may be used to power an electric vehicle and provide high voltage direct current output. In addition to providing energy for propulsion, the traction battery may provide energy for other vehicle electrical systems.

The vehicle 102 may also include, or be a client of, the charging market system 172. This system may facilitate a marketplace for customers to pay other customers for a higher rate of charge at a charging station. For example, a first customer may plug in their vehicle for a first rate of charge. Each of the other customers also charging at the same charge station may also receive the first rate of charge. The first customer, however, may desire a higher rate of charge. The first customer may provide an offer to the other customers. The offer may include a price per mi/hour rate of charge. In one example, the price may be $1 for each 20 kw/hr. rate of charge. The other customers may decide whether to accept this offer, decline this offer, or counter-offer. The exchange of funds between the customers may be made using Blockchain. The exchange may also be in the form of non-currency, such as tokens. In another example, the communication regarding the offer and response to the offer may be made over vehicle-to-vehicle communication, other wireless networks, or via the charging wire.

In the above example, if two customers accept the first customer's offer, then the first customer may then receive a 140 mi/hour rate of charge and transfer $1 to each of the accepting customers.

The vehicle 102 may include a wireless controller 108 and antenna (not separately shown) to allow the vehicle 102 to wirelessly communicate with various charging stations, as well as other vehicles. Additionally or alternatively, communications between the vehicle 102 and the charging stations may be carried over the charging wire (not shown). The controller 108 may include network hardware configured to facilitate communication between the computing platform 104. The wireless controller 108 may facilitate access to a cellular modem and the antenna to facilitate wireless communication with a wide-area network. The wide-area network may include one or more interconnected communication networks such as a cellular network, the Internet, a cable television distribution network, a satellite link network, a local area network, and a wired telephone network, as some non-limiting examples.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the remote telematics server or shuttle server 162 or other network services via the device modem 158.

Figure 2:
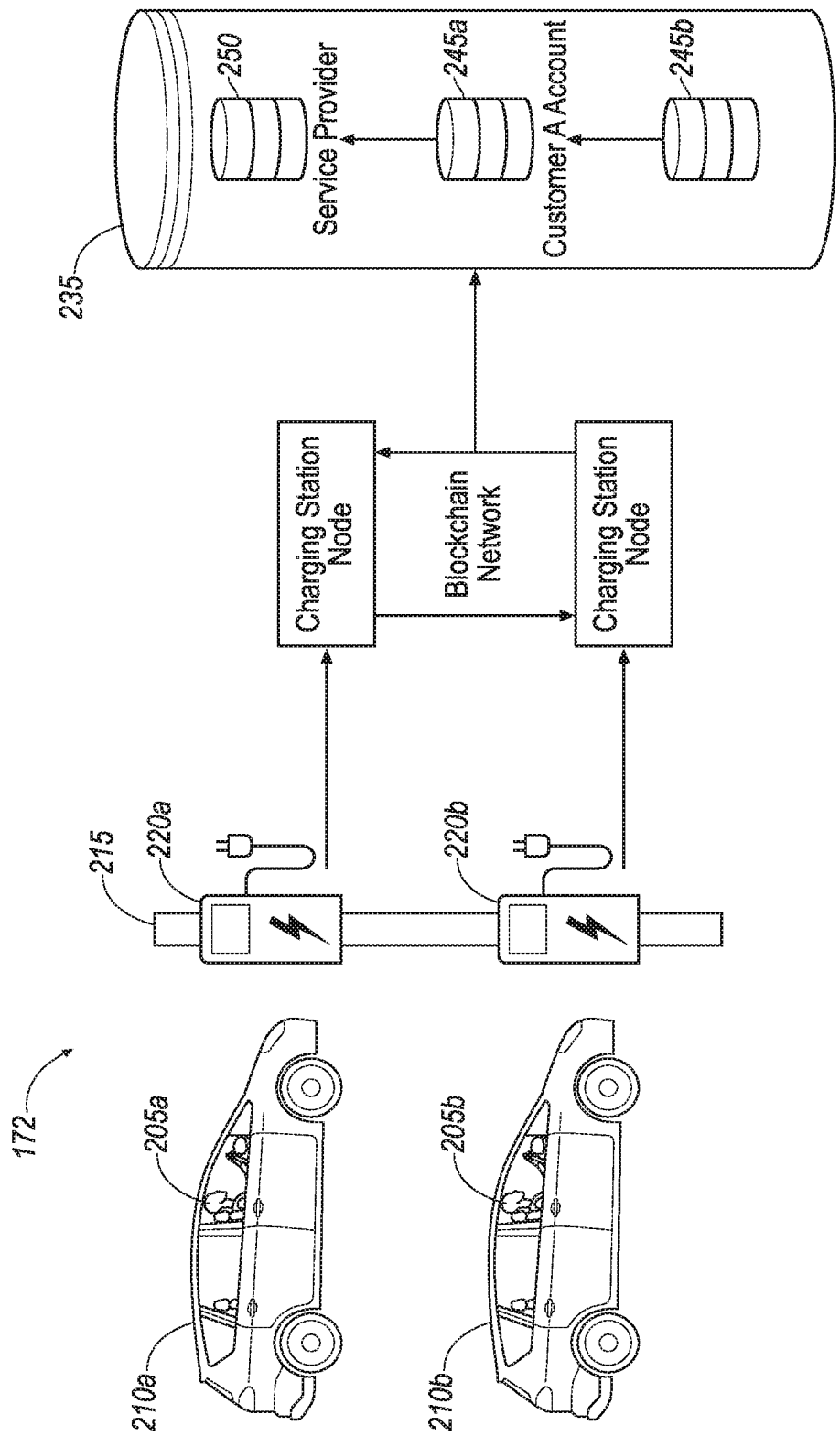
FIG. 2 illustrates an example charging market system.

FIG. 2 illustrates an example charging market system 172. The system 172 may include a plurality of customers 205 and their associated vehicles 210, similar to vehicle 102 described with respect to FIG. 1. The vehicle 102 and its customer 205 may be considered a client of the market system 172. The customers 205 may include a first customer 205a at a first vehicle 210a, and a second customer 205b at a second vehicle 210b. The customers 205 may be parked and connected to a node or charging station 215. The charging station 215 may be configured to provide electrical power to each of the batteries 170 of the vehicles 210. As a default, the charging station 215 may be configured to provide a similar rate of charge to each of the vehicles 210.

The charging station 215 may be an electric vehicle charging station node operated by a service provider. The charging station may be a public or private station. The charging station 215 may include a plurality of charging bays 220, including a first bay 220a and a second bay 220b. Each bay 220 may include a charge port configured to connect to the vehicles 210. As explained above, the charging station 215 may be supplied by a single electrical line, thus causing the bays 220 to split the power supplied to the vehicles 210 when more than one vehicle 210 is concurrently charging.

Once connected to the charging station 215, the customers 205 may connect to a charging station node 230. The charging station node 230 may be a network and infrastructure set up to authenticate the customer 205 and/or the vehicles 210. The charging station node 230 may be maintained in a cloud or a separate server. Similar to the vehicle 102, the node 230 may include one or more processors configured to perform instructions, commands and other routines in support of the processes described herein. Such instructions and other data may be maintained in a non-volatile manner using a variety of types of computer-readable storage medium. The computer-readable medium (also referred to as a processor-readable medium or storage) includes any non-transitory medium (e.g., a tangible medium) that participates in providing instructions or other data that may be read by the node 230. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. Within the vehicle 210, the computing platform 104 may be configured to execute instructions of the charging market system 172.

The node 230 may communicate with a database 235 or memory of customers and associated accounts 245. A first account 245a may be associated with the first customer 205a, and a second account 245b may be associated with the second customer 205b. The associated accounts 245 may include funds or tokens associated with each user. For example, the funds may be monetary units deposited to the user's account by the user. Tokens may represent a form of currency acquired by the user. These tokens may be traded between the customers 205. A service provider account 250 may be associated with the provider of the charging station 215. The service provider may collect a fee for facilitating the charging, as well as collect a fee for allowing certain customers to increase their charging rate. The database 235 may also maintain a unique vehicle identifier associated with each vehicle 210 and/or customer 205.

Various transactions between the customers 205 may occur. In this example charging market system 172, customers 205 may negotiate for certain charging rates. In one example, the first customer 205a may make an offer to the second customer 205b. The offer may include a bid for a higher rate of charge. The offer may include a desired rate of charge and a proposed rate. The rate may be a flat rate for an increase in charge rate. The rate may alternatively be an amount of funds for each kwH of increased charge rate. The offer, or request, may be made through the charging station node 230. The node 230 may communicate with the database 235 to verify that the first customer 205a has enough funds or tokens in his or her account (e.g., the first user's account 245a) to meet the terms of the offer. If the first customer 205a has enough funds, the charging station node 230 may then transmit the offer to the second customer 205b. The second customer 205b may then decide whether or not to accept the offer, decline the offer, or counter the offer.

If the second customer 205b decides to accept the offer, a response is transmitted via the node 230 and funds or tokens are distributed from the first customer's account 245a to the second customers account 245b. The node 230 also instructs the associated charging bays 220 to increase the rate of charge for the first vehicle 210a and decrease the rate of charge for the second vehicle 210b.

If the second customer 205b declines the offer, each vehicle 210 may continue to charge at equal or near equal rates. If the second customer 205b, in response to the offer, would consider decreasing its charging rate, but under different terms, (i.e., a higher fee or lower rate of charge decrease), then the second customer 205b may transmit a counteroffer to the node 230. The node 230 may verify that such counteroffer is feasible in that the first customer 205b has enough funds or tokens to facilitate the transaction under the counteroffer terms. If the counteroffer terms are verified, the node 230 may then transmit the terms of the counteroffer to the first customer 205a. The first customer may accept, decline, or further counter the counteroffer. Each subsequent counteroffer may be verified by the node 230 to ensure funds or available to complete the offer.

The database 235 may track the transactions by using an on-chain token that represents a fiat currency value. These microtransactions may be more efficiently facilitated using fiat currency due to their low-cost/benefit per transaction. For example, some financial transactions, such as the Automated Clearing House (ACH), may cost around two cents per transaction. Credit transactions may cost 29 cents or more per transaction. Moving tokens that represent fiat currency on private blockchain may be essentially free, or at least of nominal cost. Further, on-chain tokens are very easily used in the earning split chain node logic.

The offers and responses may be facilitated via an interface on an application or website on the mobile device 152, the display 138 within the vehicle 210, or a display on the charging station 215. The interface may facilitate the offers and counteroffers, as well as responses to the offers by utilizing various drop down menus, fillable forms, etc.

Customers 205 may purchase tokens via the node 230 from the auto manufacturer, or other third party service provider. For example, new tokens may be deposited into the customer account 245 when a customers pays with fiat currency. A customer 205 may load their wallet with $10 USD in exchange for 1000 tokens to use for charging. A customer 205 may then likewise cash in their tokens for fiat currency. By utilizing the cryptographic identified in blockchain, microtransactions for charging BEVs may be used.

Figure 3:
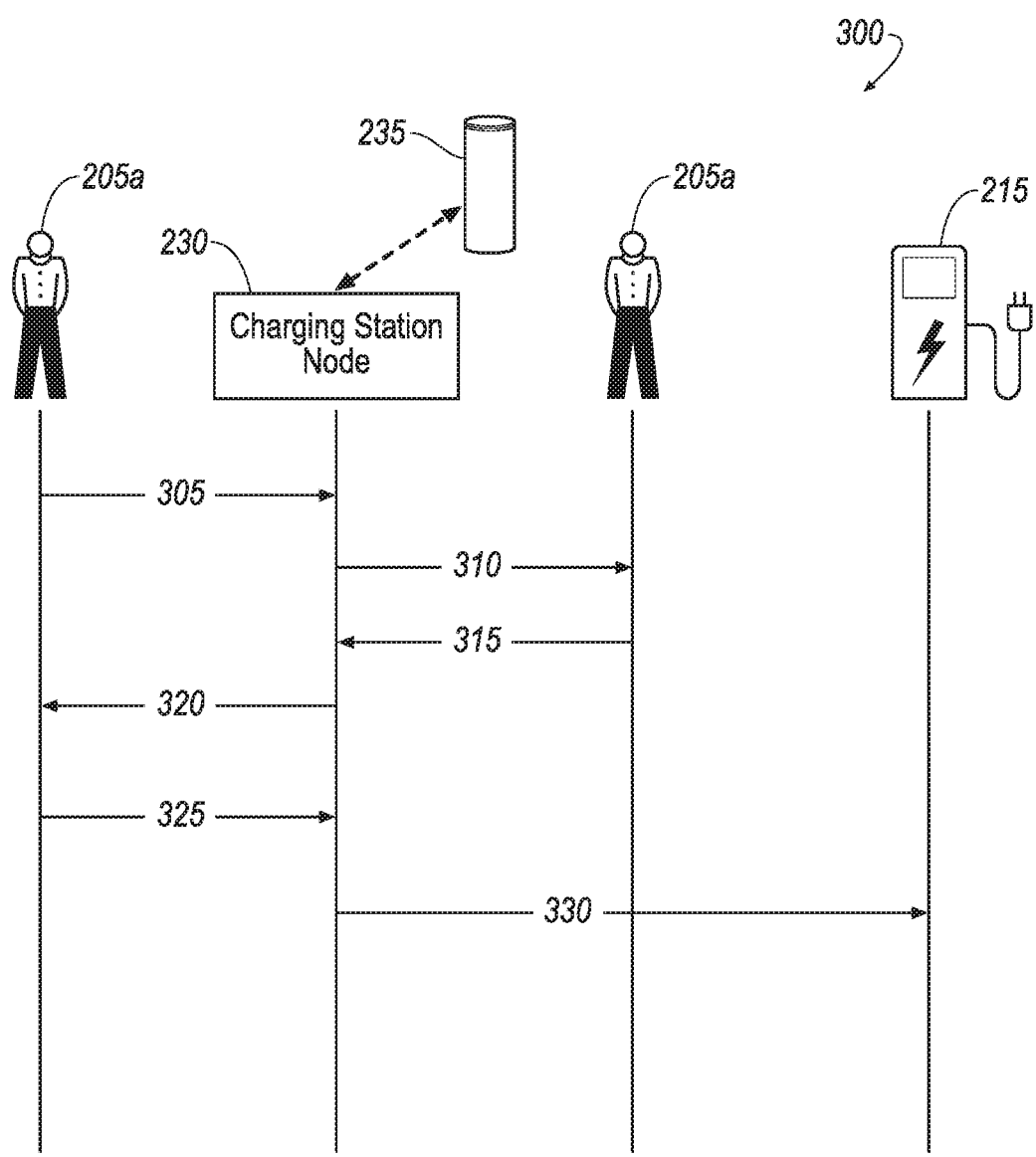
FIG. 3 illustrates an example process for the charging market system.

FIG. 3 illustrates an example process 300 for the charging market system 172. In the example of FIG. 3, two vehicles 210 may be charging at a charging station 215. Under normal circumstances, each bay 220 of the charging station 215 may split the power supplied to the charging station. For example, if two bays 220 are in use, and the charging station 215 receives 120 kwh, then each vehicle may be charging at 60 kwh. The first customer 205*a* may be in a hurry and may wish to charge his or her vehicle 210 at a higher rate. The first customer 205*a* may make an offer to achieve the higher rate of charge at step 305. The offer may include a desired rate of charge increase, as well as a fee for that increased rate of charge. In one example, the offer may be $1 for each 20 mi/hr. rate of charge.

The offer may be transmitted to the node 230. The node 230 may communicate with the database 235 to determine whether the first customer's account 245*a* includes enough funds, including money or tokens, to fulfill this offer, should it be accepted. That is, can the first customer 205*a* afford to pay for the increased rate of charge with the current funds in the customer's account 245*a*. If so, the node 230 may transmit the offer to the second customer 205*b* at 310. The second customer 205*b* may then decide whether to accept, decline, or counter the offer. The second customer 205*b* may counteroffer with adjusted terms at 315. For example, the counteroffer may be $2 for each 10 mi/hr. of rate of charge. The node 230 may then verify that the first customer 205*a* can afford these terms.

If so, the counteroffer may be transmitted to the first customer 205*a* at 320. The first customer 205*a* may accept the counteroffer at 325, the acceptance transmitted to the node 230. The node 230 may update the respective customer accounts 245 by moving funds or tokens from the first customer account 245*a* to the second customer's account 245*b*. The node 230 may then instruct the charging station 215 to alter the rate of charge per the counteroffer terms.

Although FIGS. 2 and 3 illustrate two customers, more than two customers may be charging at the charging station 215. Offers may be transmitted to all or a portion of the vehicles 210 charging. In another example, the first customer 205*a* may be charging along with the second customer 205*b*, third customer (not shown), and fourth customer (not shown). All may be charging at a rate of 100 mi/hr. The first customer 205*a* may desire a higher rate of charge and offer to pay $1 for each 20 mi/hr. increase in rate of charge. The second customer 205*b* and third customer elect to accept the offer, each receiving an amount of tokens worth at least a portion of $1. In some examples, the tokens are valued at approximately 90% of $1. The remaining 10% may be paid to the charging station service provider for managing the rate of charge. Because two of the three remaining customers accepted the first customer's offer, the first customer 205*a* may now appreciate a rate of charge of 140 mi/hr.

Figure 4:
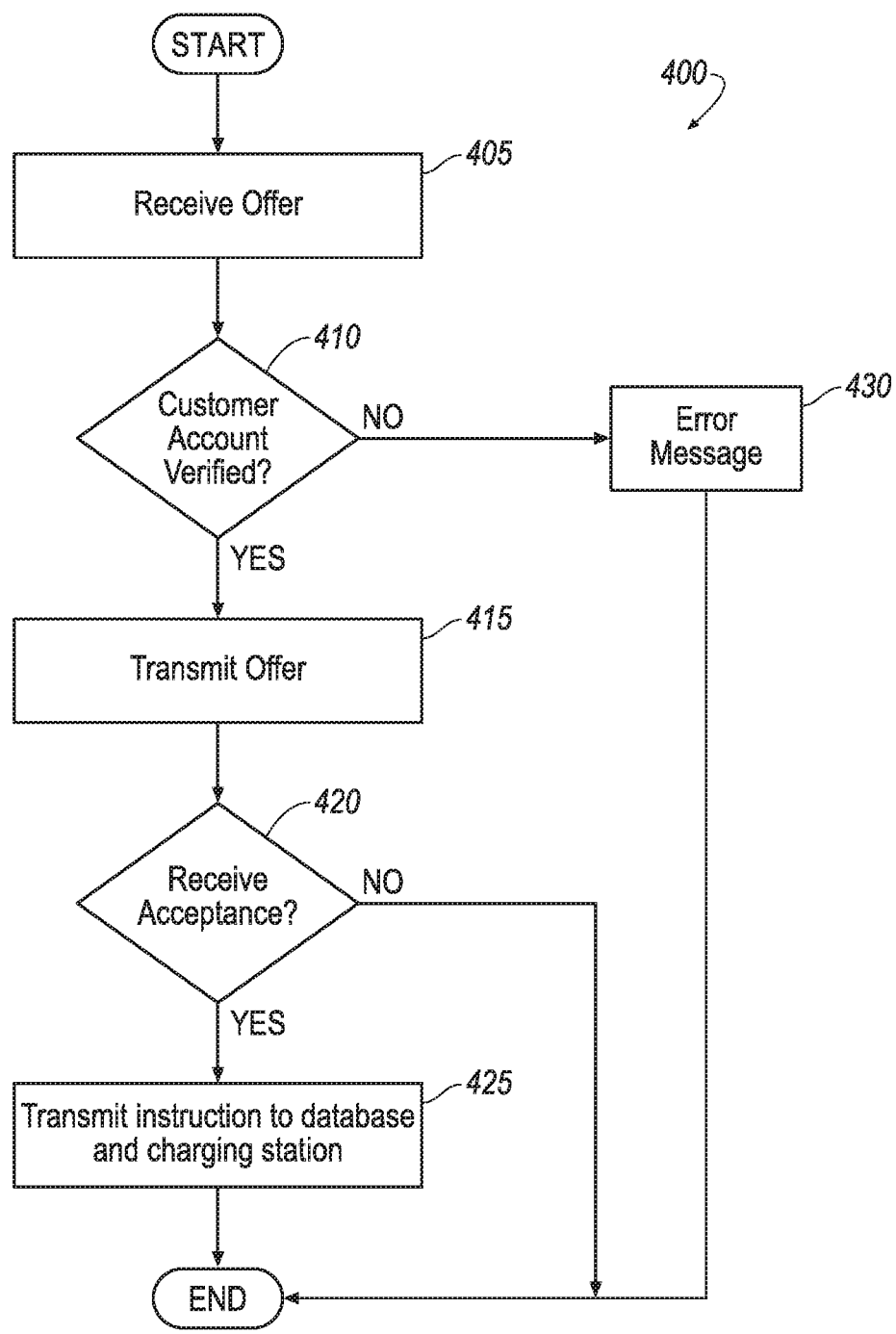
FIG. 4 illustrates an example flow chart for a process for the charging market system at a charging node.

FIG. 4 illustrates an example flow chart for a process 400 for the charging market system 172 at the node 230. The process 400 may begin at block 405 where the node 230 may receive an offer from a customer 205. The offer may include a rate and a fee, such as a dollar amount or token amount.

At block 410, the node 230 may verify, via the database 235, that the customer making the offer can in fact pay for the increased rate of charge. That is, the node may verify that the customer's account 245 has sufficient funds. If the account is verified, the process 400 proceeds to block 415. If not the process 400 proceeds to block 430.

At block 415, the node 230 may transmit the offer to the other customers 205 currently charging at the charging station 215.

At block 420, the node 230 may determine whether an acceptance of the offer has been received. If the node 230 receives an acceptance from at least one of the other customers 205, the process 400 proceeds to block 425. If not, the process 400 ends.

At block 425, the node 230 may instruct the database 135 to transfer the fee from the requesting customer to the accepting customer or customers. The node 230 may also provide instructions to the charging station 215 to increase and decrease the rate of charge for the requesting customer and accepting customer, respectively. The node 230 may verify that the charge increase was successful prior to transferring the associated tokens.

At block 430, the node 230 may provide an error message to the customer 205 via the interface indicating that the offer cannot be completed due to a lack of funds in the customer's account 245. The message may allow a customer selectable option of replenishing the funds.

Figure 5:
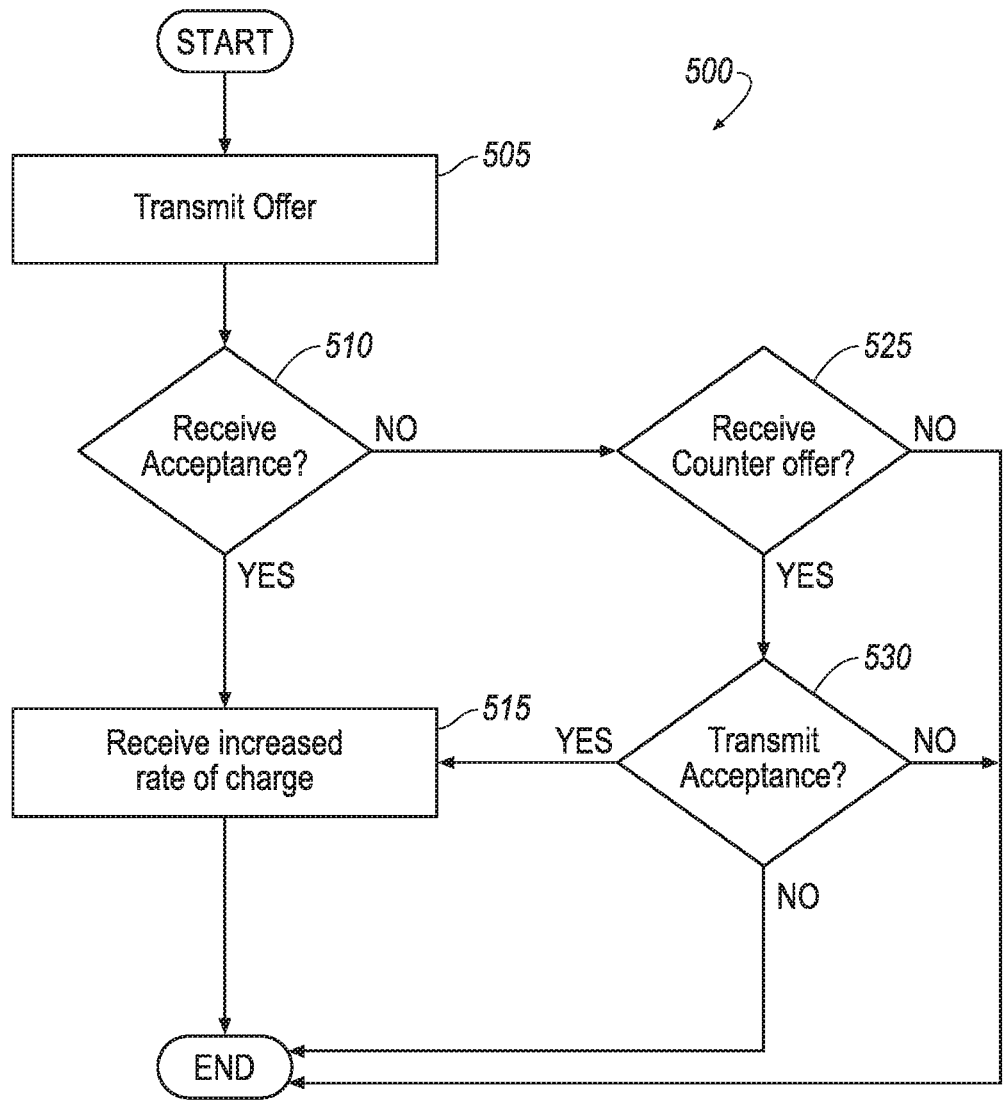
FIG. 5 illustrates an example flow chart for a process for the charging market system at the vehicle.

FIG. 5 illustrates an example flow chart for a process 500 for the charging market system 172 at the vehicle 210. The process 500 may begin at block 505 where the customer 205, via the processor 105, may transmit an offer to the node 230. The offer may include a rate and a fee, such as a dollar amount or token amount.

At block 510, the processor 105 may determine whether an acceptance of the offer has been received. If the processor 105 receives an acceptance, the process 500 proceeds to block 515. If not, the process 500 proceeds to block 525.

At block 515, the vehicle battery 170 may receive a higher rate of charge from the charging station 215.

At block 525, the processor 105 may determine whether a counteroffer was received. If so, the process 500 may proceed to block 530. If not, the process may end.

At block 530, the processor 105 may determine whether the customer accepted the counteroffer. This may be facilitated via customer input at the interface 136 within the vehicle 102.

Accordingly, disclosed herein is a charging market system to allow users to purchase higher rates of charge from other customers using blockchain. The charging marketplace system may facilitate transactions between customers or clients using a centralized node to facilities the exchange of tokens for rate of charge. Customers may receive a high degree of satisfaction by receiving tokens when they do not require a high rate of charge and conversely customers who do desire a high rate of charge may appreciate being able to achieve such rates.

Computing devices, such as the processor, controller, remote servers, remote devices, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A charging system for a battery powered vehicle, comprising;
    a memory configured to maintain customer accounts;
    a charging station; and
    a processor configured to:
        receive a request from a first customer at a charging station for a desired increase in rate of charge, the request including the desired increase in rate of charge and a first fee;
        transmit the request to at least one other customer at the charging station in response to verification of the customer account associated with the first customer; and
        instruct the charging station to increase the rate of charge for the first customer and decrease the rate of charge for the at least one other customer in response to the at least one other customer accepting the request;
    the charging station charging a battery powered vehicle associated with the first customer according to the instruction.

2. The system of claim 1, wherein the processor is further configured to compare the first fee with an amount of funds in the customer account associated with the first customer.

3. The system of claim 1, wherein the processor is further configured to receive a counteroffer from the at least one other customer.

4. The system of claim 3, wherein the counteroffer includes a second fee differing from the first fee.

5. The system of claim 4, wherein the processor is further configured to compare the second fee with an amount of funds in the customer account associated with the first customer.

6. The system of claim 5, wherein the processor is further configured to transmit the counteroffer to the first customer in response to the amount of funds in the customer account associated with the first customer exceeding the second fee.

7. The system of claim 1, wherein the processor is further configured to transmit an error message in response to a failed verification of the customer account associated with the first customer.

8. A charging system for a battery powered vehicle, comprising;
    a memory configured to maintain customer accounts;
    a charging station; and
    a processor configured to:
        receive a request from a first customer at a charging station for a desired increase in rate of charge and a first fee;
        compare the first fee with an amount of funds in the customer account associated with the first customer;
        transmit, in response to the amount of funds in the customer account associated with the first customer exceeding the first fee, the request to at least one other customer at the charging station in response to verification of the customer account associated with the first customer; and
        instruct the charging station to increase the rate of charge for the first customer and instruct the memory to transfer funds from the customer account associated with the first customer to at least one customer account associated with the at least one other customer in response to the at least one other customer accepting the request;
    the charging station charging a battery powered vehicle associated with the first customer according to the instruction.

9. The system of claim 8, wherein the processor is further configured to receive a counteroffer from the at least one other customer.

10. The system of claim 9, wherein the counteroffer includes a second fee differing from the first fee.

11. The system of claim 10, wherein the processor is further configured to compare the second fee with an amount of funds in the customer account associated with the first customer.

12. The system of claim 11, wherein the processor if further configured to transmit the counteroffer to the customer in response to the amount of funds in the customer account associated with the first customer exceeding the second fee.

13. The system of claim 8, wherein the first fee is an amount of non-currency tokens.

* * * * *